United States Patent [19]

Bernard et al.

[11] Patent Number: 4,692,224

[45] Date of Patent: Sep. 8, 1987

[54] VOLATILE ANODIZING ELECTROLYTES FOR TANTALUM

[75] Inventors: Walter J. Bernard; Steven M. Florio, both of Williamstown, Mass.

[73] Assignee: Sprague Electric Company, North Adams, Mass.

[21] Appl. No.: 895,062

[22] Filed: Aug. 11, 1986

[51] Int. Cl.$^4$ .............................................. C25D 11/00
[52] U.S. Cl. ................................ 204/56.1; 204/14.1; 204/58.5; 428/469
[58] Field of Search ................ 204/56.1, 14.1, 58.5; 29/570; 428/469

[56] References Cited

PUBLICATIONS

"Basic Princ. of Org. Chem." Roberts et al, Cal. Tech., W. A. Benjamin Inc., 1965, p. 507.
Handbook of Chem. & Physics, 32nd Ed., Chem. Rubber Co., 1950, pp. 662–663, 666–667, 114–115, 1116–1117.

Primary Examiner—R. L. Andrews

[57] ABSTRACT

A dielectric film is formed on tantalum pellets by anodization up to 350 V in an electrolyte of an aqueous solution of an organic carboxylic acid with an ionization constant between $10^{-2}$ and $10^{-5}$. The tantalum pellets are suspended from aluminum-magnesium alloy bars into the electrolytic solution with the bar itself being suspended in the electrolyte. The organic carboxylic acid solute residue from anodization is readily volatile at 200° C. The acid is sometimes combined in the electrolyte with ammonia or an amine having a boiling point less than 200° C.; the electrolyte residues from anodization in these systems are also volatile at 200° C. After anodization, tantalum pellet and aluminum-magnesium bar cleanup is thus accomplished by a brief heat treatment at 200° C., eliminating the need for an extended rinse procedure.

5 Claims, No Drawings

VOLATILE ANODIZING ELECTROLYTES FOR TANTALUM

BACKGROUND OF THE INVENTION

This invention relates to a series of volatile formation electrolytes for tantalum pellets, and more particularly to electrolytes volatile at 200° C. which need not be rinsed out of the pellets subsequent to anodization.

Anodized tantalum pellets enjoy widespread use as anodes in solid-electrolyte capacitors. The dielectric oxide film of such capacitors is generally formed by anodic oxidation of tantalum pellets suspended from stainless steel or aluminum alloy bars into an electrolyte.

Typical prior art electrolytes consist of dilute aqueous solutions of mineral acids or the salts of mineral acids such as phosphoric, sulfuric, nitric, or hydrochloric acid. In the case of anodizations in sulfuric or phosphoric acid (or their salts), the electrolyte residues in the tantalum pellets after anodization have high boiling points. The removal by heating of these residues at 200° C. or less is thus not possible. To remove the residues by heating to higher temperatures will result in damage to the oxide film, leading to high DC leakage currents in finished capacitors. Therefore, the method of cleaning tantalum pellets anodized in these prior art electrolytes generally involves extended rinsing in water, the duration of which varies according to pellet size (the larger pellets requiring longer rinses).

While anodization of tantalum pellets to high voltages may occur in these prior art acid electrolytes, aluminum bars are not compatible. The aluminum bar may be anodized in aqueous solutions of the salts of phosphoric acid (but not of sulfuric acid): however, the same problem of solute residue cleanup remains.

In the case of prior art anodization of tantalum pellets in aqueous nitric or hydrochloric acid, no extended rinsing procedure is necessary, because the electrolyte residues are volatile at 200° C. However, the useful voltage range of tantalum pellets in these electrolytes is limited to 100 V. This limitation is caused by the effect of the electrolyte becoming highly concentrated in the pores of the pellet during anodization. Since nitric and hydrochloric acid electrolytes behave more poorly with respect to maximum formation voltage as their concentrations are increased, a self-limiting useful range is created. Additionally, these acids (and their salts) are not compatible with aluminum alloy bars, because, during attempted anodization, aluminum dissolution, not oxide growth, is the primary anodic process.

If these strong acids and their salts are thus eliminated from consideration as volatile anodizing electrolytes for tantalum and aluminum alloy bars, the choice becomes quite restricted. Weak acids and their salts—such as boric acid and borates—cannot be used because the conductivity of the acid is so low that oxide growth in the pellet interior is severely retarded.

Thus, the potential candidates for volatile anodizing electrolytes for tantalum pellets are limited to acids (and their salts) of the proper strength, such that the following conditions are fulfilled: first, that the concentrated free acid which is formed in the pores of the pellet during anodization is of sufficient conductivity that anodization of the pellet interior will occur; and second, that the concentrated free acid which is formed in the pellet pores can support the desired formation voltage. Also, the acid (or its salts) should be cleanly volatile at temperatures less than or equal to 200° C., to eliminate extended post-anodization rinsing.

It has been recognized in the prior art that the acids in formation electrolytes for tantalum pellets optimally have ionization constants greater than $10^{-5}$, in order to maintain the correct environment for uniform tantalum pellet formation.

SUMMARY OF THE INVENTION

In accordance with this invention, organic carboxylic acids or their ammonia or amine salts in aqueous or water/ethylene glycol solution at 25°–95° C. are used to anodize tantalum pellets up to 350 V, with the subsequent cleanup procedure limited to a 15–30 minute heat treatment at 100°–200° C. This procedure results in significant cost savings, as it eliminates the need for the post-anodization rinse procedure which is necessary when the anodizing electrolyte residue is not volatile.

The series of organic carboxylic acids with ionization constants between $10^{-2}$ and $10^{-5}$, in aqueous or mixed aqueous/ethylene glycol solution, support anodization of tantalum over the voltage range 100–350 V. The maximum useful voltage is determined empirically, depending on the particular acid, electrolyte resistivity, and electrolyte pH. This effectively extends the maximum voltage to a range beyond that attainable on tantalum pellets with volatile aqueous mineral acids such as nitric or hydrochloric acid.

This invention utilizes these electrolytes, with their already stated advantages, as anodizing solutions for the aluminum-magnesium alloy bars which function as tantalum pellet carriers throughout the processing of such pellets into solid-tantalum capacitors.

The electrolyte of this invention containing the particular organic carboxylic acid may be partially or fully neutralized with ammonia or an amine with a boiling point of 200° C. or less, while retaining the same tantalum pellet formation capability.

The electrolyte residue which remains after formation may be cleanly volatilized by a 15–30 minute treatment at 100°–200° C. This eliminates the need for the long post-anodization rinse procedures necessary with phosphoric or sulfuric acid formation electrolytes.

The volatile tantalum pellet electrolyte composed of an organic carboxylic acid with an ionization constant between $10^{-2}$ and $10^{-5}$, which may or may not be neutralized with ammonia or an amine with a boiling point of 200° C. or less, is a compatible formation electrolyte for aluminum-magnesium alloy bars.

It has been found when tantalum pellets, on stainless steel or aluminum alloy bars, of varying diameters are anodized in an aqueous or water:ethylene glycol solution of the organic carboxylic acids (or their salts), the anodization properties (specifically, maximum formation voltage and DC leakage current at constant voltage) vary considerably, depending upon solution composition, concentration of solute, resistivity, and pH. While the exact reasons for these variations are not known, they are readily determinable on an empirical basis.

DESCRIPTION OF THE PREFERRED EMBODIMENTS

Organic carboxylic acids which have the desired properties of ionization constant between $10^{-2}$ and $10^{-5}$ and a boiling point of 200° C. or less are:

| Acid | $K_I$ | Boiling Point (°C.) |
|---|---|---|
| Acetic | $2 \times 10^{-5}$ | 118 |
| citric | $8 \times 10^{-4}$ | 153 |
| fumaric | $1 \times 10^{-3}$ | 200 |
| maleic | $1 \times 10^{-2}$ | 135 |
| oxalic | $7 \times 10^{-2}$ | 150 |
| salicylic | $1 \times 10^{-1}$ | 76 |

The first two Examples are representative of the results obtained using aqueous solutions of the acids as anodizing electrolytes for tantalum pellets and aluminummagnesium alloy bars, although the particular maximum voltage attainable is still dependent on solute chosen, concentration, and resistivity. The results obtained with electrolytes of this invention are compared to those obtained using aqueous mineral acid electrolytes.

EXAMPLE 1

Two groups of tantalum pellets of different diameters were anodized on stainless steel bars in an aqueous 0.02M solution of oxalic acid ($\rho_{80°\,C.}=103$ Ω-cm) at 80° C. and 100 mA/gram current density. Identical pellets were anodized in a like manner to 100 V in 0.01% phosphoric acid ($\rho_{80°\,C.}=1300$ Ω-cm). Anodizations were done to either maximum voltage or to a set voltage with a four hour hold to determine DC leakage. The results are set forth below:

| Electrolyte | Pellet Diameter | Maximum Voltage | DC Leakage (mA) at 70 V | At 100 V |
|---|---|---|---|---|
| 0.02 M oxalic | 0.075 in | 220 V | — | 0.20 |
| 0.01% phosphoric | 0.075 in. | 290 V | — | 0.10 |
| 0.02 M oxalic | 0.250 in. | 210 V | 0.36 | — |
| 0.01% phosphoric | 0.250 in. | 270 V | 2.90 | — |

Anodization of aluminum bars was not possible in any of the above electrolytes.

EXAMPLE 2

Tantalum pellets of 0.250 inch diameter on stainless steel bars (bars not immersed) were anodized in an aqueous 0.11M salicylic acid electrolyte ($\rho_{80°\,C.}=152$ Ω-cm) to maximum voltage, or to 140 V with a four hour constant voltage hold, at 80° C., 100 mA/g constant current density. Identical pellets were anodized in a like manner in 0.01% phosphoric acid ($\rho_{80°\,C.}=1300$ Ω-cm). The anodization results were:

| Electrolyte | Max. Voltage | DC Leak. at 140 V (mA) |
|---|---|---|
| 0.011 M salicylic | 260 | 1.4 |
| 0.01% phosphoric | 270 | 0.95 |

Anodization of aluminum alloy bars in phosphoric acid was not possible. However, in the 011M salicylic acid electrolyte, formation reached a maximum of 238 V.

The following two Examples serve to illustrate the effect of adding ammonia or volatile amines to aqueous electrolytes containing carboxylic acids. The amines which are suitable for this purpose are:

| Base | Ionization K | Boiling Point (°C.) |
|---|---|---|
| Ammonium Hydroxide | $1.8 \times 10^{-5}$ | — |
| Benzylamine | $2.0 \times 10^{-5}$ | 185 |
| Di-n-propylamine | $8.2 \times 10^{-4}$ | 110 |
| Ethanolamine | $2.8 \times 10^{-5}$ | 171 |
| Morpholine | — | 129 |
| Piperazine | $6.4 \times 10^{-5}$ | 146 |
| Pyridine | $6.5 \times 10^{-6}$ | 116 |
| Triethylamine | $5.7 \times 10^{-4}$ | 89 |
| Tri-n-propylamine | $5.0 \times 10^{-4}$ | 157 |

EXAMPLE 3

A 0.067M aqueous ethanolammonium salicylate electrolyte ($\rho_{80°\,C.}=102$ Ω-cm) was utilized to anodized tantalum pellets of 0.250 inch diameter on stainless steel bars to maximum voltage or to 140 V with a 4 hour constant voltage hold, at 80° C., 100 mA/gram constant current. This is compared to the same formation of identical tantalum pellets in 0.01% phosphoric acid. The results were:

| Electrolyte | Max. Voltage | DC Leakage at 140 V (mA) |
|---|---|---|
| 0.067 M ethanolammonium salicylate | 232 | 0.83 |
| 0.01% phosphoric | 270 | 0.95 |

The 0.067M ethanolammonium salicylate was capable of anodizing aluminum-magnesium alloy bars to 190 V maximum.

EXAMPLE 4

A 0.04M aqueous ammonium acetate electrolyte ($\rho_{80°\,C.}=114$ Ω-cm) was utilized to anodize tantalum pellets of 0.250 inch diameter on stainless steel bars to maximum voltage or to 140 V with a 4 hour constant voltage hold, at 80° C., 100 mA/gram constant current. This is compared to anodization of identical tantalum pellets in 0.01% phosphoric acid. The results were:

| Electrolyte | Max. Voltage | DC Leakage at 140 V (mA) |
|---|---|---|
| 0.04 M ammonium acetate | 190 | 0.90 |
| 0.01% phosphoric | 270 | 0.95 |

Additionally, the ammonium acetate electrolyte is capable of forming aluminum-magnesium alloy bars to 85 V maximum.

The following Example illustrates the effect of altering the electrolyte composition by replacing some of the water with ethylene glycol.

EXAMPLE 5

A 0.04M solution of ammonium acetate in a solvent composed of 75% glycol/25% water was used to anodize 0.250 inch diameter tantalum pellets to 140 V at 100 mA/gram, 80° C., with a 4 hour constant voltage hold. This electrolyte additionally was utilized to anodize aluminum-magnesium alloy bars to maximum voltage. These results are compared to those obtained from 0.04M aqueous ammonium acetate:

| Electrolyte | DC Leakage at 140 V (mA) | Maximum Voltage on Aluminum-Magnesium Bars |
|---|---|---|
| 0.04 M ammonium acetate in 75/25 ethylene glycol: water | 6.8 | 143 |

| Electrolyte | DC Leakage at 140 V (mA) | Maximum Voltage on Aluminum-Magnesium Bars |
|---|---|---|
| 0.04 M ammonium acetate | 0.90 | 85 |

As shown above, depending on composition, electrolytes containing organic carboxylic acids (or their ammonia or amine salts) in aqueous or ethylene glycol/water solution, are capable of anodizing tantalum pellets in a manner comparable to electrolytes of aqueous mineral acids. The advantages enjoyed by using the electrolytes of this invention include higher maximum formation voltage than aqueous nitric or hydrochloric acids (or their salts); volatility at 200° C. or less to eliminate the extended rinsing procedures necessary to remove post-anodization electrolyte residues from sulfuric or phosphoric acid (or their salts) formations; and the capability to anodize aluminum-magnesium alloy bars.

The following Example illustrates a preferred embodiment of the invention, whereby the maximum voltage attainable on aluminum magnesium alloy bars is high, and the DC leakage on tantalum pellets is low.

EXAMPLE 6

A 0.02M solution of aqueous ammonium salicylate was used to anodize 0.250 inch diameter tantalum pellets to 140 V at 100 mA/gram, 80° C., with a 4 hour constant voltage hold. This electrolyte additionally was utilized to anodize aluminum-magnesium alloy bars to maximum voltage. These results are compared to those obtained for 0.04M aqueous ammonium acetate:

| Electrolyte | DC Leakage at 140 V (mA) | Maximum Voltage on Aluminum-Magnesium Bars |
|---|---|---|
| 0.02 M ammonium salicylate | 1.8 | 85 |
| 0.04 M ammonium acetate | 0.90 | 300 |

What is claimed is:

1. An anodized film formed over the voltage range of 100 V to 350 V throughout the pores of tantalum pellets suspended from an aluminum alloy bar in a volatile electrolyte comprising an organic carboxylic acid selected from the group of acetic and salicylic acids, said electrolyte during anodization provides concentrated free acid within said pores of said pellets of a conductivity that supports anodization over said voltage range, said acid being cleanly volatile from said pores at 200° C. or less.

2. The electrolyte of claim 1 wherein said acid is at least partially neutralized with ammonia or an amine having a boiling point of 200° C. or less.

3. The electrolyte of claim 2 wherein said amine is selected from the group of ammonium hydroxide, benzylamine, di-n-propylamine, ethanolamine, morpholine, piperazine, pyridine, triethylamine, and tri-n-propylamine.

4. The electrolyte of claim 2 wherein said electrolyte is aqueous ammonium acetate.

5. The electrolyte of claim 2 wherein said electrolyte is aqueous ammonium salicylate.

* * * * *